UNITED STATES PATENT OFFICE.

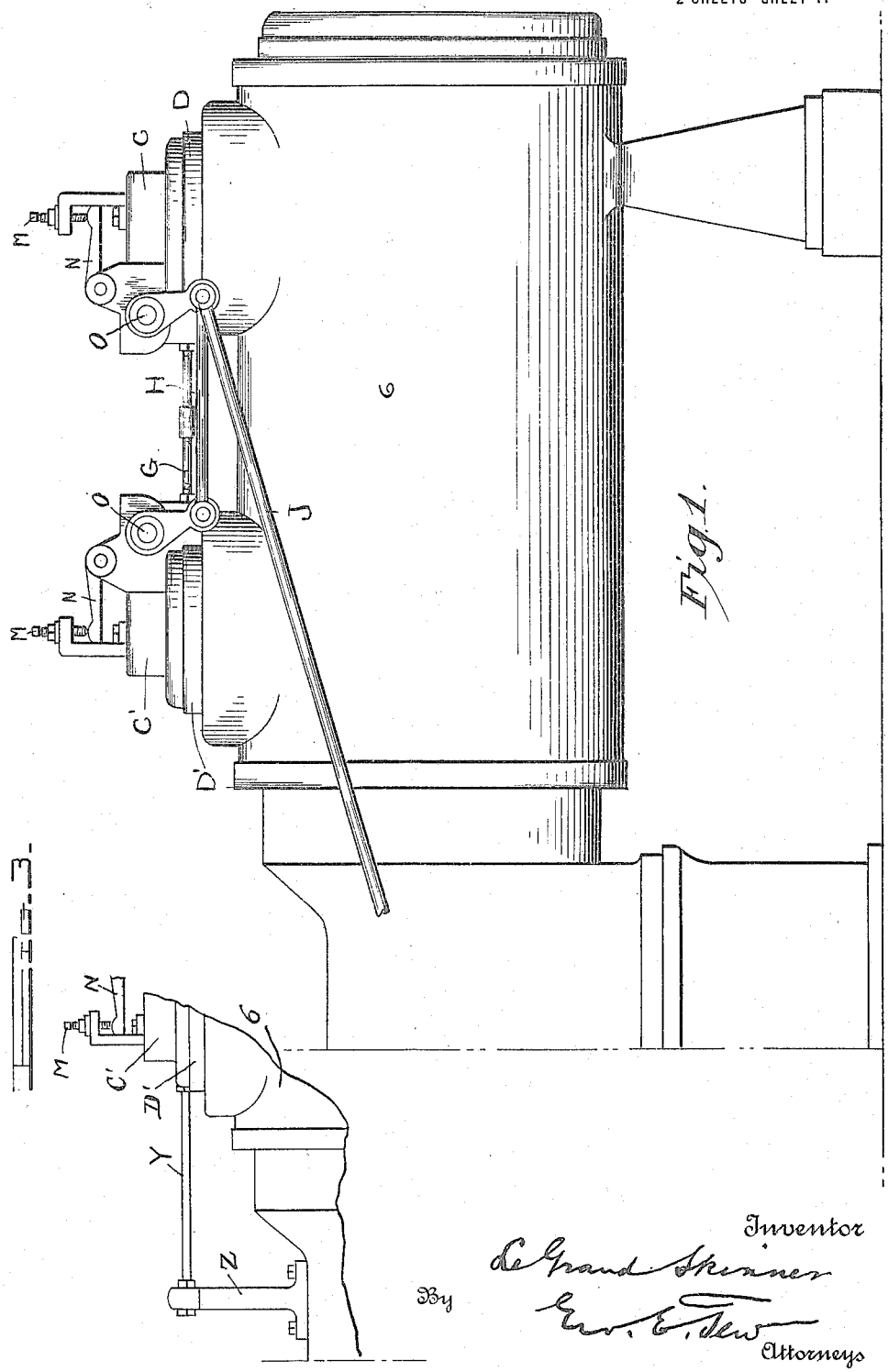

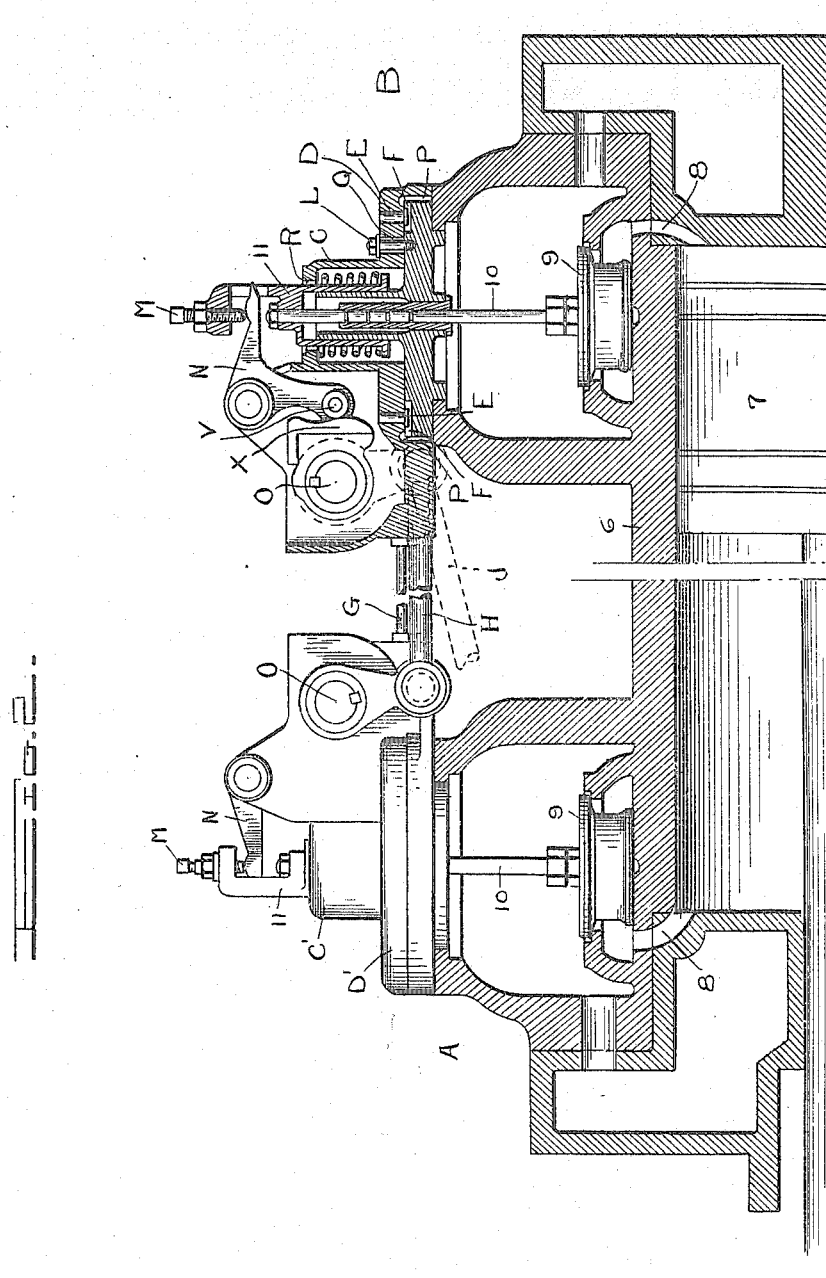

LE GRAND SKINNER, OF ERIE, PENNSYLVANIA.

COMPENSATING VALVE-GEAR.

1,270,980.

Specification of Letters Patent.

Patented July 2, 1918.

Application filed October 13, 1917. Serial No. 196,378.

*To all whom it may concern:*

Be it known that I, LE GRAND SKINNER, a citizen of the United States, residing at Erie, in the county of Erie and State of Pennsylvania, have invented certain new and useful Improvements in Compensating Valve-Gears, of which the following is a specification This invention relates to valves for steam engines, and is particularly useful in connection with engines using puppet valves, and has for its main object to provide a construction which will permit or accommodate expansion of the cylinder without impairing or distorting the operative functions or timing of the valves.

The defects arising from expansion of steam engine cylinders with respect to the valve action, are discussed in my pending application Ser. No. 181,832, and are well understood, and need not be repeated herein, the present invention relating to one way for correcting the timing errors which would otherwise follow from such expansion.

In the present invention the desired result is accomplished by providing a construction which permits the cylinder to expand without disturbing the relative location of the valve operating gear. When the cylinder expands, one at least of the valves travels with it, but by the present invention the cam box or support does not travel, a loose or sliding action being provided between the cam box and the bonnet on the valve chest, through which the valve stem extends. This will be more clearly understood from the following description and accompanying drawings, in which—

Figure 1 is a side elevation of an engine provided with the invention.

Fig. 2 is a vertical longitudinal section, somewhat enlarged.

Fig. 3 is a detail of a modification.

In the drawings, 6 indicates the cylinder, 7 the piston, 8 the inlet ports and 9 the inlet puppet valves of a known engine, the valve chambers being closed by bonnets D and D' through which the valve stems 10 operate, the details of the valve guides and associated parts being similar to those shown for example in my U. S. Patent #1,033,204, the upper end of each valve stem being connected to a head 11 which carries a set screw M which is engaged by the bell-crank lever N to lift and open the valve.

The crank end of the cylinder is indicated at A, and the head end at B, and when the cylinder expands the greatest variation or movement will occur at the head end, as it will tend to travel away from the bed connection nearest the crank shaft. Therefore the devices to accommodate the expansion are preferably located at the head end.

The rocker box C' at the crank end of the cylinder is or may be rigidly attached to its bonnet D'. At the head end of the cylinder the rocker box C, however, is slidable upon the bonnet D. It is held down thereon by bolts L and guided by pins E in slots F. A clearance space P is therefore provided between the box C and the bonnet D, as well as a clearance space Q beside the bolts L, and a clearance space R between the box C and the head 11 on the valve stem.

The levers N are operated by cams X on rockers O which cams wipe against rollers Y on the levers, these rockers being mounted in the boxes C and C' and having arms connected by a link rod H, and operated by connection of one of the arms to a reach rod J which will be reciprocated by suitable connections to the crank shaft (not shown). The boxes C and C' are connected by an adjustable rod G which holds them at a fixed distance apart.

In the operation of this construction, expansion of the cylinder will carry with it the valve and bonnet D at the head end of the cylinder, as well as the head 11 on the valve stem, and the bonnet D will slide under the rocker box C which, by reason of the connection G, will remain in relatively fixed position. Accordingly the relative position of the cam rockers O is not varied and they will continue to operate at the proper times, according to the governor or other regulation. In the movement incident to expansion the set screw M will travel along the arm of the lever N, but this will not vary the timing of the valve to any objectionable extent, as the lever will continue to operate the same under all conditions and the variation of the surface is very small compared to the stroke of the lever. Hence by connecting the valve operating mechanisms in fixed relation, and allowing at least one of the valves to have a sliding movement with respect thereto, incident to expansion or contraction of the cylinder, the timing of the valves is not distorted.

Although in the above description and accompanying drawings only one rocker box is shown mounted slidably on its bonnet, it is within the scope of the invention to slidably mount both of the rocker boxes and connect them by a rod Y to a fixture Z on the engine bed, as shown in Fig. 3, and this will not only accommodate any movement of the head end of the cylinder incident to expansion, but will also accommodate any slight movement of the crank end of the cylinder, with respect to the bed, by permitting both valves to move laterally with respect to the cam rockers and levers. It will be appreciated that when the cam rockers are in fixed relation to the cylinder and valves, and move therewith under expansion of the cylinder, the angular relation between the cam rockers and the eccentric or reach rod is varied, which causes the distortion or variation of timing which this invention is designed to cure.

The invention is not limited to the particular device shown and described but may be embodied in various other forms, within the scope of the following claims.

I claim:

1. The combination with an engine cylinder and a valve therefor, of an operating device for the valve, an operating mechanism for said device, and a support for said device slidably mounted on the cylinder, to permit movement of the valve incident to expansion or contraction of the cylinder without varying the position of said device relative to said mechanism.

2. The combination with an engine cylinder and a valve therefor, of a rocker operatively connected to the valve, an operating mechanism for said rocker, and a support for the rocker loosely mounted on the cylinder, to permit expansion of the latter without varying the position of the rocker relative to the said operating mechanism.

3. The combination with an engine cylinder and valves at opposite ends thereof, of rockers having cams operatively connected to the valves respectively, and supports for the rockers, said supports being connected together, and at least one of the supports being slidably mounted on the cylinder, thereby permitting expansion of the latter without varying the position of said rockers with respect to each other.

4. The combination with an engine cylinder and a valve therefor, of a valve gear for the valve, and an operating mechanism for the gear, said gear being slidably mounted on the cylinder to permit longitudinal expansion of the latter without varying the position of the gear relative to the operating mechanism.

5. The combination with an engine cylinder and valves at opposite ends thereof, of boxes connected together and mounted on the cylinder, and connected rockers mounted in the boxes respectively and operatively connected to the valves, at least one of the boxes being loosely mounted on the cylinder to permit movement of the latter incident to expansion.

6. The combination with an engine cylinder and puppet valves at opposite ends thereof, of bonnets over the valves, supports mounted on said bonnets, and valve-operating devices carried by said supports and engaging the valve stems, said supports being connected to each other and one of them being shiftable on one of the bonnets, to permit movement of the cylinder and bonnet relative to said supports.

7. The combination with an engine cylinder and a valve therefor, of a valve gear for the valve, operating devices for said gear, a support for said gear mounted on the cylinder, and means to retain the valve gear in fixed position relative to said devices under movement of the cylinder and valve incident to expansion of the former, said means including a loose joint between said support and the cylinder.

8. The combination with an engine cylinder and valves at opposite ends thereof, of an operating device for each valve, a support for each device, mounted on the cylinder, and means to maintain a fixed distance between said devices, while permitting expansion of the cylinder, said means including a sliding joint between at least one of said supports and the cylinder.

In testimony whereof, I affix my signature in presence of two witnesses.

LE GRAND SKINNER.

Witnesses:
A. E. ROSE,
HARRY G. ADAM.